(12) United States Patent
Myers et al.

(10) Patent No.: US 10,715,586 B2
(45) Date of Patent: *Jul. 14, 2020

(54) APPLICATION DEMONSTRATION SYSTEM

(71) Applicant: ADP, LLC, Roseland, NJ (US)

(72) Inventors: Clint Myers, Suwanee, GA (US);
Brian Ross Feinberg, Cumming, GA (US)

(73) Assignee: ADP, LLC, Roseland, NJ (US)

( * ) Notice: Subject to any disclaimer, the term of this patent is extended or adjusted under 35 U.S.C. 154(b) by 219 days.

This patent is subject to a terminal disclaimer.

(21) Appl. No.: 15/938,467

(22) Filed: Mar. 28, 2018

(65) Prior Publication Data

US 2018/0219940 A1   Aug. 2, 2018

Related U.S. Application Data

(63) Continuation of application No. 14/844,414, filed on Sep. 3, 2015, now Pat. No. 10,069,901.

(51) Int. Cl.
*G06F 15/16* (2006.01)
*H04L 29/08* (2006.01)
*H04L 29/06* (2006.01)
*H04L 9/08* (2006.01)

(52) U.S. Cl.
CPC ............ *H04L 67/10* (2013.01); *H04L 9/0861* (2013.01); *H04L 9/0866* (2013.01); *H04L 67/02* (2013.01); *H04L 67/141* (2013.01); *H04L 67/42* (2013.01)

(58) Field of Classification Search
CPC ..... H04L 67/10; H04L 9/0861; H04L 67/141; H04L 67/02; H04L 67/42
See application file for complete search history.

(56) References Cited

U.S. PATENT DOCUMENTS

| 6,804,778 | B1* | 10/2004 | Levi | ........................ H04L 45/00 709/203 |
| 7,376,581 | B2 | 5/2008 | DeRose et al. | |
| 8,074,289 | B1 | 12/2011 | Carpentier et al. | |
| 2004/0054923 | A1 | 3/2004 | Seago et al. | |
| 2004/0255194 | A1* | 12/2004 | Genkin | ............... G06F 11/3688 714/28 |
| 2006/0047496 | A1* | 3/2006 | Genkin | ................. H04L 41/145 703/22 |

(Continued)

OTHER PUBLICATIONS

Office Action, dated Jul. 19, 2017, regarding U.S. Appl. No. 14/844,414, 22 pages.

(Continued)

*Primary Examiner* — Padma Mundur
(74) *Attorney, Agent, or Firm* — Yee & Associates, P.C.

(57) ABSTRACT

A method, computer system, and computer program product for a standalone demonstration of an application. Requests sent from the application running on a browser to a server data processing system are detected. Responses received from the server data processing system for the requests sent from the application are detected. The requests and the responses for the application are stored in a data structure. The requests and the responses enable simulating the server data processing system to perform the standalone demonstration of the application running on the browser on a client data processing system using the data structure without communicating with the server data processing system.

20 Claims, 12 Drawing Sheets

(56) References Cited

U.S. PATENT DOCUMENTS

2006/0265190 A1* 11/2006 Hein .................. G06F 11/3414
702/186
2012/0110110 A1   5/2012 Luna et al.
2017/0070559 A1   3/2017 Myers et al.

OTHER PUBLICATIONS

Final Office Action, dated Jan. 24, 2018, regarding U.S. Appl. No. 14/844,414, 10 pages.
Notice of Allowance, dated May 7, 2018, regarding U.S. Appl. No. 14/844,414, 14 pages.

* cited by examiner

FIG. 7

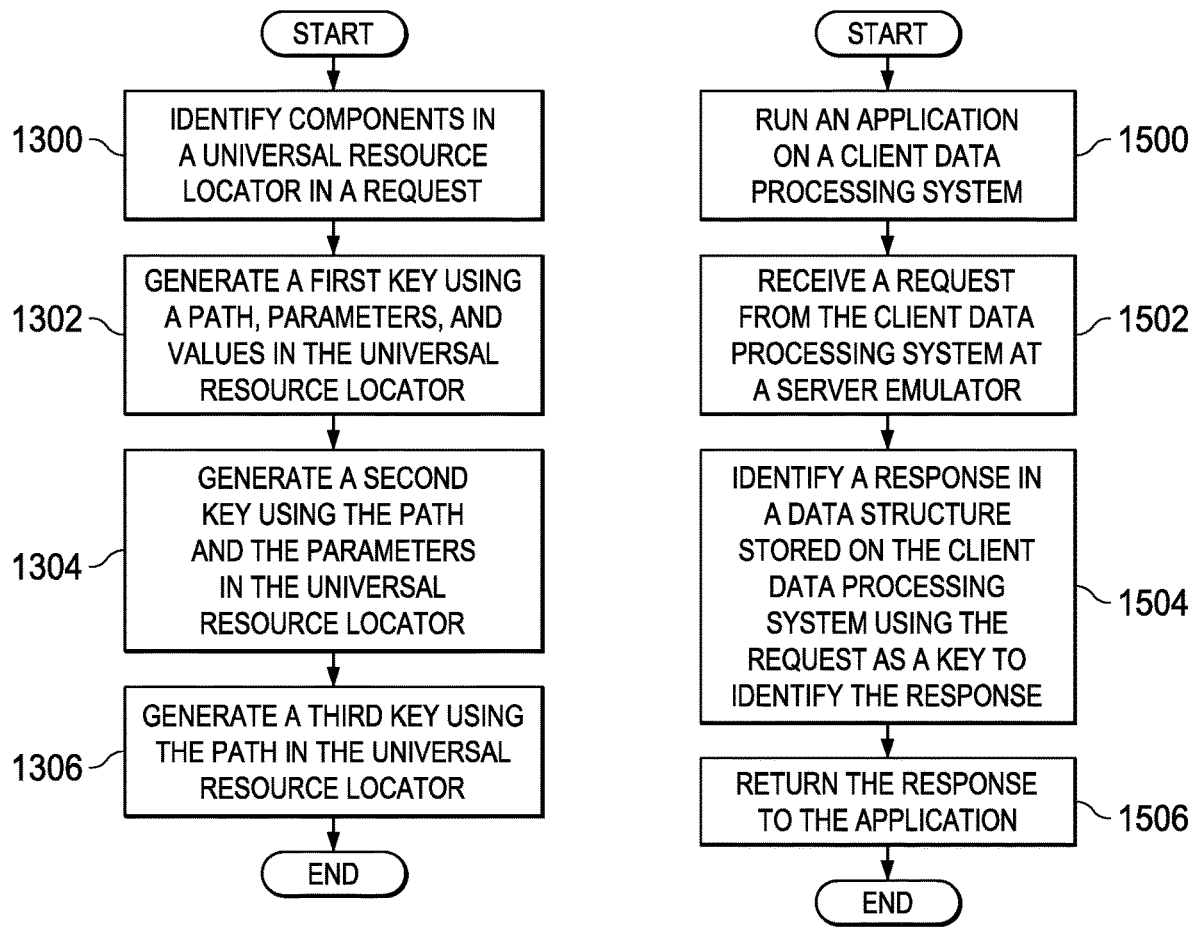
FIG. 13
FIG. 15
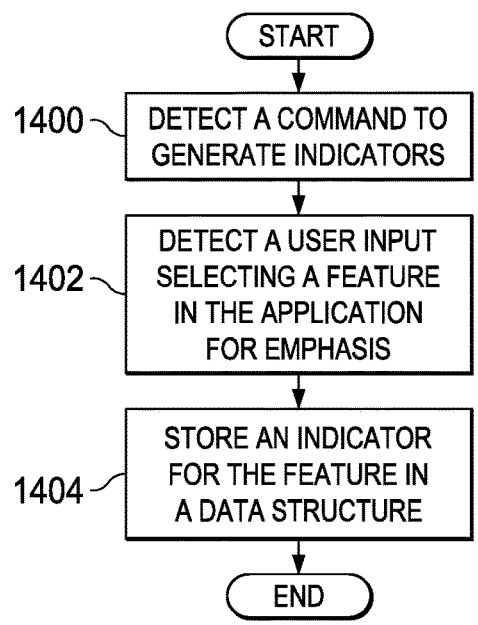
FIG. 14

APPLICATION DEMONSTRATION SYSTEM

BACKGROUND INFORMATION

1. Field

The present disclosure relates generally to an improved computer system and, in particular, to a method and apparatus for running an application. Still more particularly, the present disclosure relates to a method and apparatus for running an application without communication with a server data processing system that normally provides responses to the application to operate.

2. Background

Many organizations develop software. Some organizations are solely in the business of developing and selling software. Other organizations provide services in addition to developing software. For example, an organization may provide payroll and human resource services to clients. The organization may also offer clients software in the form of applications for use with the services. These applications may be, for example, web applications that are in a web page running on a browser.

In developing applications, sales people in the organization market the application to current clients, potential clients, or a combination thereof. For example, a sales person may demonstrate the operation of an application to a client. The sales person may desire to demonstrate selected features in the application that may be of interest to the client.

The demonstration of the application may take place in different locations. For example, the sales person may meet the client at the client's business. In another example, the sales person may meet the client at a coffee shop, a restaurant, a convention center, or some other location.

Depending on the location, demonstrating features of the application may be more difficult than desired. The application uses an internet connection to access a web server in performing functions.

In some locations, an internet connection may be unavailable. An internet connection may be present but may be slower than desired for demonstrating the application. These conditions make demonstrating features in the application more difficult than desired. For example, if the connection is unavailable, the different features of the application may not operate. Also, if the connection is slower than desired, then the client may not view the operation of the application in optimal conditions. For example, long delays in displaying information during other operations may occur.

Further, even when an internet connection is present, the sales person often desires to have a predictable experience for the client when demonstrating features of the application. For example, the demonstration may involve the application retrieving records from a web server. If the data in the records is changed or the records are removed, then the results displayed in the demonstration may not be the ones desired for presentation to a particular client.

For example, if the client is in the healthcare industry, the sales person may desire to demonstrate the application using data about the healthcare industry. If the data on the web server is changed to data about automotive manufacturing prior to the demonstration, then the demonstration of the application using the data may not provide the desired experience for the presentation to the client.

As a result, the demonstration of the application may be unpredictable. The speed or smoothness in operation of the application may not be predictable because the quality of the internet connection may be unknown for the demonstration. In another example, the data displayed by the application may not be predictable.

Therefore, it would be desirable to have a method and apparatus that take into account at least some of the issues discussed above, as well as other possible issues. For example, it would be desirable to have a method and apparatus that overcome a technical problem with demonstrating an application that provides a predictable experience to the client.

SUMMARY

An embodiment of the disclosure provides a method for a standalone demonstration of an application. Requests sent from the application running on a browser to a server data processing system are detected. Responses received from the server data processing system for the requests sent from the application are detected. The requests and the responses for the application are stored in a data structure. The requests and the responses enable simulating the server data processing system to perform the standalone demonstration of the application running on the browser on a client data processing system using the data structure without communicating with the server data processing system.

Another embodiment of the disclosure provides a method for a standalone demonstration of an application. The application is run on a browser on a client data processing system. A server emulator receives a request from the client data processing system at the server emulator in which the request is directed to a server data processing system. The server emulator identifies a response in a data structure stored on the client data processing system using the request as a key to identify the response. The data structure stores requests previously sent to the server data processing system and responses for the application received from the server data processing system. The server emulator returns the response to the application. The requests and the responses stored in the data structure enable simulating the server data processing system to perform the standalone demonstration of the application running on the browser on the client data processing system using the data structure without communicating with the server data processing system.

Another embodiment of the disclosure provides a computer system comprising an application running on a browser and a recorder. The recorder detects responses received from a server data processing system for requests sent from the application and stores the requests and responses for the application in a data structure. The requests and the responses enable simulating the server data processing system to perform a standalone demonstration of the application running on the browser on a client data processing system using the data structure without communicating with the server data processing system.

Another embodiment of the disclosure provides a computer system comprising a client data processing system, an application running on a browser on the client data processing system, and a server emulator. The server emulator receives a request from the client data processing system at the server emulator in which the request is directed to a server data processing system and identifies a response in a data structure stored on the client data processing system using the request as a key to identify the response. The data structure stores requests previously sent to the server data processing system and responses for the application received from the server data processing system. The server emulator also returns the response to the application. The requests and the responses stored in the data structure enable simulating the server data processing system when performing a standalone demonstration of the application running on a browser on the client data processing system using the data structure without communicating with the server data processing system to obtain the responses.

Yet another embodiment of the disclosure provides a computer program product for a standalone demonstration of an application. The computer program product comprises a computer readable storage media, and first program code, second program code, and third program code stored on the computer readable storage media. The first program code detects requests sent from an application running on a browser to a server data processing system. The second program code detects responses received from the server data processing system for the requests sent from the application. The third program code stores the requests and the responses for the application in a data structure. The requests and the responses enable simulating the server data processing system to perform the standalone demonstration of the application running on the browser on a client data processing system using the data structure without communicating with the server data processing system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of an application in a web page in a browser in accordance with an illustrative embodiment;

FIG. 13 is an illustration of a flowchart of a process for generating a tier of keys in accordance with an illustrative embodiment;

FIG. 14 is an illustration of a flowchart of a process for creating indicators for features in an application in accordance with an illustrative embodiment;

FIG. 15 is an illustration of a flowchart of a process for demonstrating an application in accordance with an illustrative embodiment;

DETAILED DESCRIPTION

Figure 1:
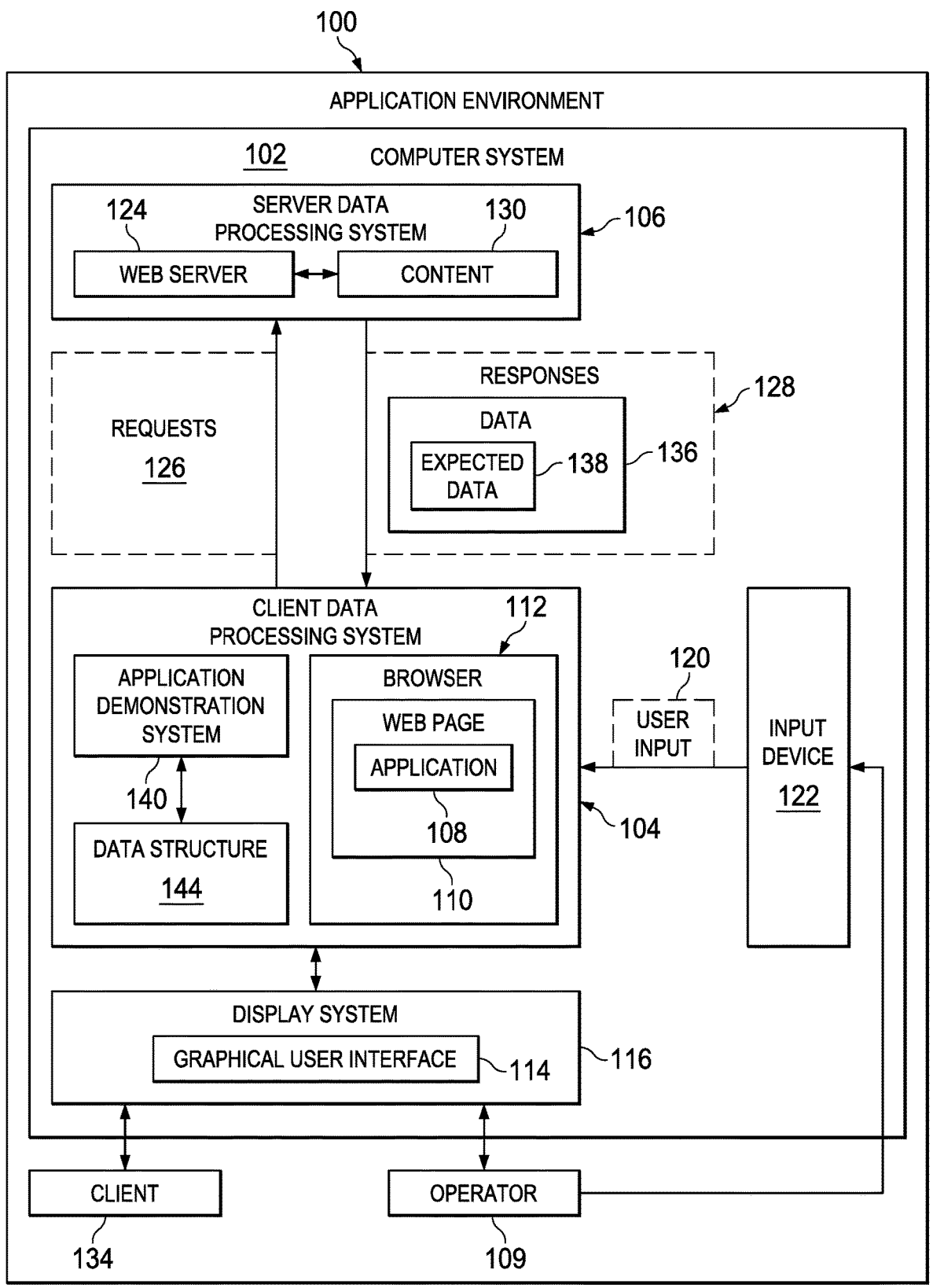
FIG. 1 is an illustration of a block diagram of an application environment in accordance with analyst embodiment in accordance with an illustrative embodiment.

The illustrative embodiments recognize and take into account one or more different considerations. For example, the illustrative embodiments recognize and take into account that one solution for presenting an application in a web page with a predictable experience involves creating a presentation using static web pages. Features in the application selected for presentation to a client may be used by an operator when the application is running on a data processing system that has a desired connection to the web server and the desired data for the demonstration is present on the web server. During the process of operating the application, static web pages may be generated and stored at different times while the operator is using the application. These static web pages show the features of the application that are to be presented to the client. These static web pages are stored locally in the data processing system that is used for the demonstration.

Thus, the illustrative embodiments recognize and take into account that the application may be demonstrated to a client at a later time with user input to the application resulting in the display of the appropriate static web page. The illustrative embodiments also recognize and take into account, however, that storing static web pages locally may not provide the desired level of interactivity with the application for demonstration purposes.

Further the illustrative embodiments recognize and take into account that this type of demonstration is closer to a video or animation rather than showing the operation of the application. As a result, a client may not obtain the desired experience of interaction with the application. For example, with the static web pages, the demonstration may require following a sequence of steps in displaying the web pages to show the features of the application.

Further, time and effort also may be needed to edit the static web pages to ensure that the static web pages are displayed as intended. As a result, the illustrative embodiments recognize and take into account that the use of previously generated static web pages may allow a demonstration of the application without connection to a web server. The illustrative embodiments recognize and take into account that this type of demonstration, however, may be more limited than desired and also may take more time and effort than desired.

Thus, the illustrative embodiments provide a method and apparatus for a standalone demonstration of an application. In a standalone demonstration, the application runs without needing an internet or other connection to a server data processing system to operate.

In one illustrative example, the process detects requests sent from the application running on a browser to a server data processing system. The process also detects responses received from the server data processing system for the requests sent from the application. The requests and responses for the application are stored in a data structure. The requests and responses enable simulating the server data processing system to perform the standalone demonstration of the application running on the browser on a client data processing system using the data structure without communicating with the server data processing system.

With reference now to the figures and, in particular, with reference to FIG. 1, an illustration of a block diagram of an application environment is depicted in accordance with an illustrative embodiment. In this illustrative example, application environment 100 includes computer system 102 in which application environment 100 may operate.

Computer system 102 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a kiosk, a set top box, a mobile phone, or some other suitable data processing system. In this illustrative example, computer system 102 includes client data processing system 104 and server data processing system 106.

As depicted, application 108 is a software application. Application 108 includes one or more programs that provide the ability for operator 109 to perform one or more functions, tasks, or activities using application 108. In this illustrative example, application 108 is located in web page 110 and runs in browser 112. Application 108 may be referred to as a web application when located in web page 110.

As depicted, browser 112 runs on client data processing system 104. In this illustrative example, application 108 in web page 110 in browser 112 is displayed in graphical user interface 114 on display system 116 for client data processing system 104.

Display system 116 is a physical hardware system that includes one or more display devices on which graphical user interface 114 may be displayed. The display devices may include at least one of a light-emitting diode display (LED), a liquid crystal display (LCD), an organic light-emitting diode display (OLED), or some other suitable device on which graphical user interface 114 can be displayed. As depicted, operator 109 is a person that may interact with graphical user interface 114 through user input 120 generated by input device 122 in client data processing system 104. For example, operator 109 may interact with application 108 as displayed in graphical user interface 114. Input device 122 may be, for example, a mouse, a keyboard, a trackball, a touchscreen, a stylus, or some other suitable type of input device.

As depicted, application 108 communicates with web server 124 on server data processing system 106 during operation of application 108. For example, application 108 sends requests 126 and receives responses 128. Web server 124 performs at least one of locating content 130 or generating content 130 in response to receiving requests 126. Content 130 is returned in responses 128.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, operator 109 desires to demonstrate application 108 to client 134. Client 134 may be a current client or a potential client. Further, client 134 may be a person or an organization.

During normal operation, application 108 sends requests 126 to web server 124 and receives responses 128 from web server 124 through browser 112. However, when demonstrating application 108, a communications link with web server 124 may not always be available or have a desired level of quality. The desired level of quality of the communications link may be, for example, a desired speed in obtaining responses 128 from web server 124 that provides a desired experience to client 134. For example, smooth operation of application 108 without delays that make application 108 appear unresponsive is desirable when demonstrating application 108.

Also, having data 136 in responses 128 be expected data 138 is desirable when demonstrating application 108. For example, if client 134 is a healthcare organization, desired data 136 may be data for the healthcare industry. If data 136 changes to data for the automobile industry, the demonstration of application 108 may not provide the experience desired for client 134.

In this illustrative example, application demonstration system 140 enables demonstrating application 108 with a predictable experience. The demonstration of application 108 does not rely on communicating with server data processing system 106 when application 108 runs in browser 112 on client data processing system 104. In other words, a network connection between client data processing system 104 and server data processing system 106 is not necessary. Also, changes in data 136 that may occur at a later time do not affect the demonstration of application 108.

Application demonstration system 140 may be implemented in software, hardware, firmware or a combination thereof. When software is used, the operations performed by application demonstration system 140 may be implemented in program code configured to run on hardware, such as a processor unit. When firmware is used, the operations performed by application demonstration system 140 may be implemented in program code and data and stored in persistent memory to run on a processor unit. When hardware is employed, the hardware may include circuits that operate to perform the operations in application demonstration system 140.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, application demonstration system 140 is implemented in computer system 102. Application demonstration system 140 may be located on a single data processing system or distributed on multiple data processing systems in computer system 102. During operation, application demonstration system 140 operates to enable a standalone demonstration of application 108.

As depicted, application demonstration system 140 detects requests 126 sent from application 108 running on browser 112 to server data processing system 106. As depicted, requests 126 are sent to web server 124 on server data processing system 106. Application demonstration system 140 detects responses 128 received from server data processing system 106 in response to requests 126 sent by application 108. Responses 128 are from web server 124 on server data processing system 106.

Application demonstration system 140 stores requests 126 and responses 128 for application 108 in data structure 144. Data structure 144 may take different forms. For example, data structure 144 may be selected from one of a database, an array, a table, a flat file, a linked list, a map, and some other suitable type of data structure.

In this example, requests 126 and responses 128 enable simulating server data processing system 106 to perform a standalone demonstration of application 108 running on browser 112 on client data processing system 104 using data structure 144 without communicating with server data processing system 106. As a result, reliance on connectivity to web server 124 on server data processing system 106 or the presence of expected data 138 on server data processing system 106 is not needed to demonstrate application 108. In this illustrative example, application demonstration system 140, data structure 144, and application 108 are located in client data processing system 104 when a standalone demonstration is performed for client 134.

In one illustrative example, one or more technical solutions are present that overcome a technical problem with demonstrating an application that provides a predictable experience to the client. Application demonstration system 140 allows for expected data 138 to be displayed by application 108 during a standalone demonstration of application 108 to client 134. Further, at least one of connectivity issues or changes in data 136 at web server 124 is avoided.

One or more technical solutions in the list of examples may provide a technical effect in which a standalone demonstration performed using an application is predictable for providing a desired experience to client. For example, what data will be displayed by the application is known ahead of time and different data or an unexpected absence of data does not occur. Also, delays in displaying data or slow responsiveness of the application may be reduced or avoided.

As a result, computer system 102 operates as a special-purpose computer system in which application demonstration system 140 in computer system 102 enables demonstrating application 108 running in browser 112 located on client data processing system 104 without needing to communicate with web server 124 on server data processing system 106 to operate. In particular, application demonstration system 140 transforms computer system 102 into a special-purpose computer system as compared to currently available general computer systems that do not have application demonstration system 140. Current computer systems may use static web pages that require a set sequence of steps in the demonstration in which the static web pages are displayed.

Current systems using static web pages also take more time and effort than desired to prepare. As a result, the demonstration does not really involve the application but is more like a dynamic slide presentation. In contrast, application demonstration system 140 does not have this constraint in demonstrating application 108. Instead, with application demonstration system 140, interaction with application 108 occurs during the demonstration.

Figure 2:
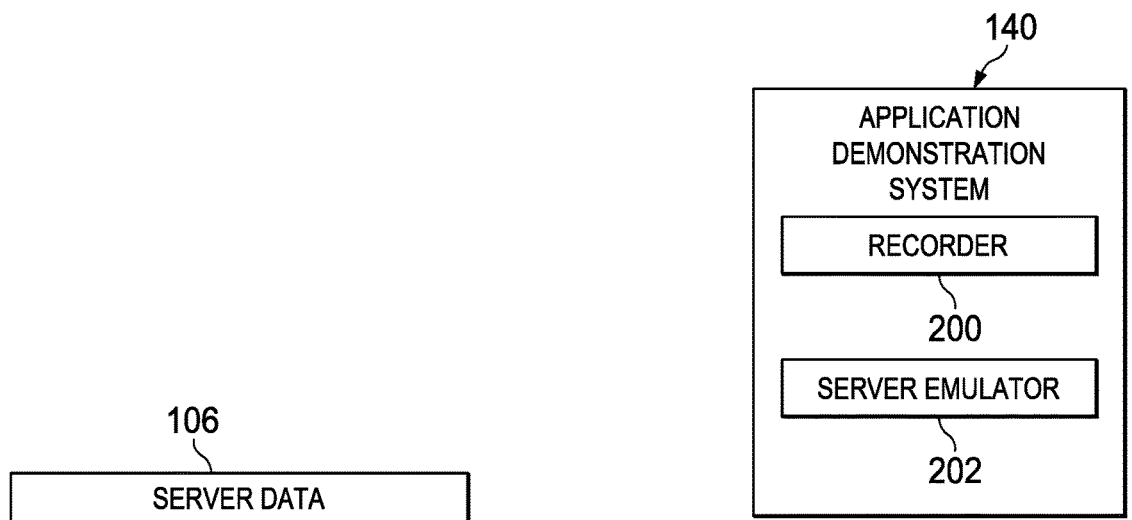
FIG. 2 is an illustration of a block diagram of an application demonstration system in accordance with an illustrative embodiment.

Turning now to FIG. 2, an illustration of a block diagram of an application demonstration system is depicted in accordance with an illustrative embodiment. In the illustrative examples, the same reference numeral may be used in more than one figure. This reuse of a reference numeral in different figures represents the same element in the different figures.

In this illustrative example, application demonstration system 140 has a number of different components. As depicted, application demonstration system 140 includes recorder 200 and server emulator 202.

Recorder 200 detects requests 126 made by application 108. Recorder 200 also detects responses 128 that are returned to application 108. In the illustrative example, recorder 200 stores requests 126 and responses 128 in data structure 144.

As depicted, server emulator 202 runs when a standalone demonstration of application 108 is performed. Server emulator 202 may be started when web page 110 with application 108 is loaded for performing a standalone demonstration.

During operation, server emulator 202 detects requests 126 made by application 108 during a standalone demonstration. In turn, server emulator 202 identifies an appropriate response in responses 128 that are stored in data structure 144 to return to application 108. Server emulator 202 returns responses 128 to application 108. In this manner, server emulator 202 emulates operations that would be performed by web server 124.

Figure 3:
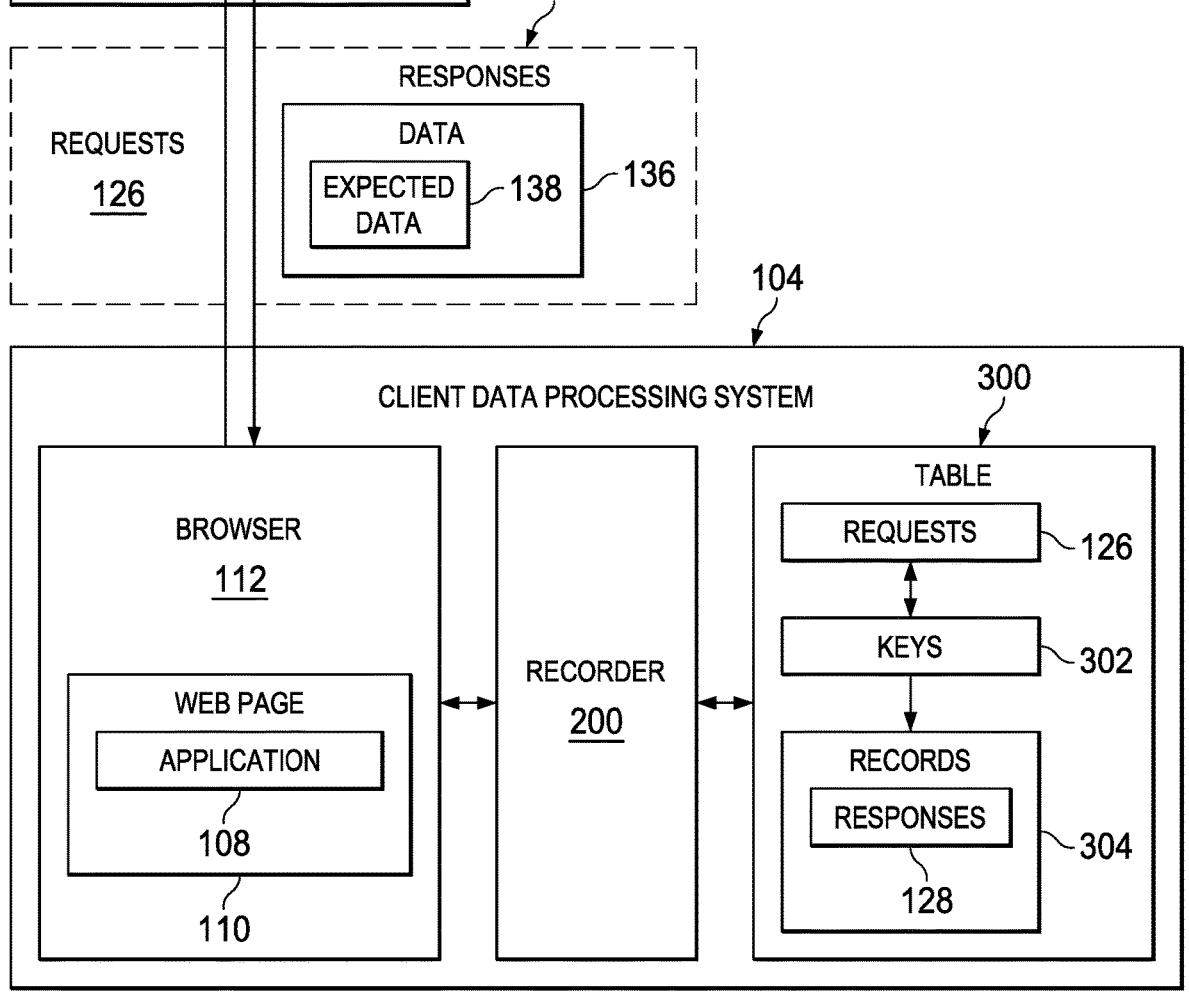
FIG. 3 is an illustration of a block diagram of data flow for creating a data structure for a standalone demonstration in accordance with an illustrative embodiment.

With reference next to FIG. 3, an illustration of a block diagram of data flow for creating a data structure for a standalone demonstration is depicted in accordance with an illustrative embodiment. In this illustrative example, data structure 144 is depicted in the form of table 300.

As depicted, application 108 in web page 110 in browser 112 sends requests 126 to web server 124 on server data processing system 106 and receives responses 128 to requests 126 from web server 124 on server data processing system 106 through browser 112.

In this illustrative example, recorder 200 identifies requests 126 made and responses 128 received. The identification may be made by listening in on these communications. For example, recorder 200 may listen to a port used by browser 112 for requests 126 and responses 128. In another illustrative example, recorder 200 may intercept requests 126 and responses 128 and relay these communications between application 108 and web server 124.

As depicted, recorder 200 stores requests 126 and responses 128 in data structure 144. Requests 126 and responses 128 may be stored in association with each other. For example, each response may be stored in association with a request that resulted in the response.

As depicted, data structure 144 takes the form of table 300 with keys 302 and records 304. Keys 302 point to records 304.

In this illustrative example, requests 126 are used as keys 302 and responses 128 are placed into records 304. A key in keys 302 is used to identify a record in records 304 in table 300. A record is a row in table 300.

As depicted, requests 126 may be used in the form identified to form keys 302 or may be processed to form keys 302. For example, a hashing function may be used to create hashes from requests 126 to form keys 302.

In this manner, an operator may operate application 108 to perform operations for features that may be used in a standalone demonstration of application 108. In the illustrative example, features are different aspects of interest in application 108. For example, the features may be functions, the manner in which information is displayed, or other aspects of application 108.

As depicted, expected data 138 is returned in responses 128, and responses 128 containing expected data 138 are stored in records 304 in table 300. As a result, the operations performed using application 108 use expected data 138.

Figure 4:
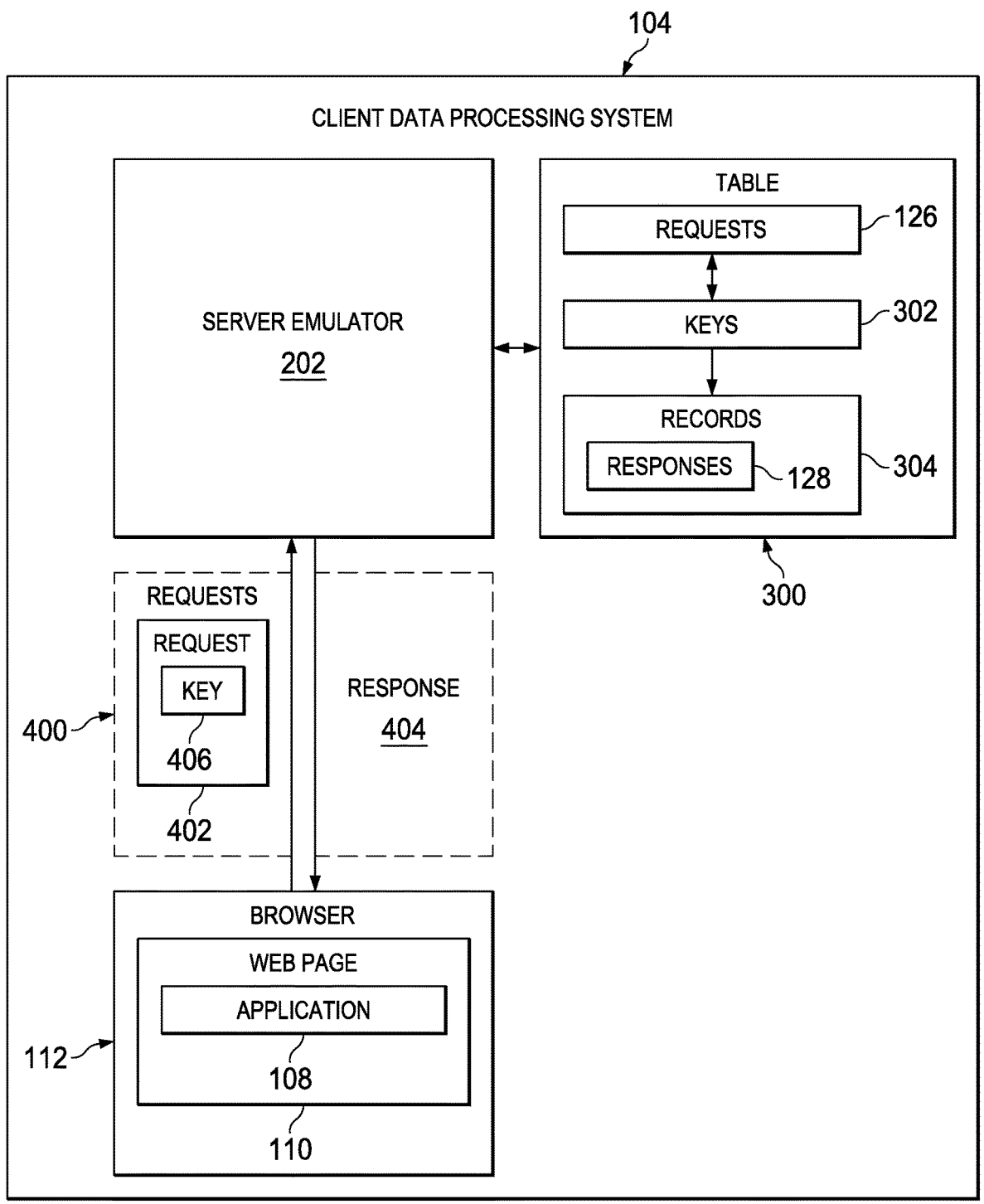
FIG. 4 is an illustration of a block diagram of data flow for a demonstrating an application in accordance with an illustrative embodiment.

With reference to FIG. 4, an illustration of a block diagram of data flow for a demonstrating an application is depicted in accordance with an illustrative embodiment. In this example, the demonstration of application 108 in web page 110 in browser 112 is performed.

As depicted, server emulator 202 intercepts requests 400 made by application 108 in web page 110 when a standalone demonstration is performed using application 108. In other words, a connection to web server 124 is unnecessary with server emulator 202 to demonstrate application 108.

In this illustrative example, browser 112 in application 108 in web page 110 may be configured to direct requests 400 made by application 108 to server emulator 202 instead of sending requests 400 to a web server. In another example, web page 110 in which application 108 is located may be configured to direct requests 400 by application 108 to server emulator 202.

Server emulator 202 takes requests 400 and identifies responses 128 to return to application 108. For example, application 108 is run on client data processing system 104. Request 402 in requests 400 from application 108 is received at server emulator 202 on client data processing system 104. Server emulator 202 identifies response 404 in responses 128 in data structure 144 in the form of table 300 stored on client data processing system 104 using request 402 as key 406 to identify response 404.

As depicted, request 402 from application 108 is used as key 406 to see if any matches with keys 302 are present. Request 402 may be used directly as key 406 or may be processed to form key 406. For example, a hash of request 402 may be performed to form key 406.

If a match is present, the record pointed to by the matching key in keys 302 is identified to be returned to application 108. In this example, the record includes response 404. The record could include other information such as notes, highlighting, or other suitable information. Server emulator 202 returns response 404 to application 108.

As depicted, application 108 operates using response 404. For example, application 108 may display data in response 404. If the feature is a human resources feature, response 404 may include human resources data in response 404 that is displayed by application 108. In another example, application 108 may perform a function using the data in response 404. For example, application 108 may perform eligibility calculations for benefits using the data in response 404.

Figure 5:
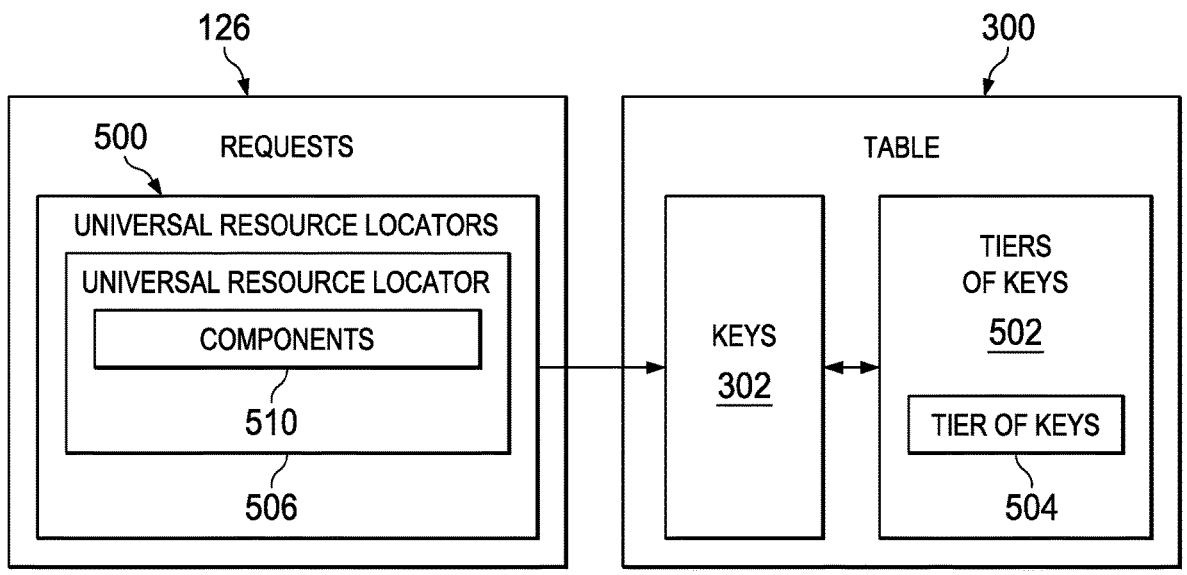
FIG. 5 is an illustration of a block diagram of a data structure in accordance with an illustrative embodiment.

Turning next to FIG. 5, an illustration of a block diagram of a data structure is depicted in accordance with an illustrative embodiment. In this example, an example of one implementation of table 300 in FIG. 3 is shown. In this depicted example, more than one key in keys 302 may point to a particular record in records 304.

As depicted, keys 302 are generated from universal resource locators 500 in requests 126. In this particular example, keys 302 are organized as tiers of keys 502.

In the illustrative example, tier of keys 504 in tiers of keys 502 is based on universal resource locator 506 in universal resource locators 500. In other words, each of tiers of keys 502 is on a universal resource locator in universal resource locators 500. Each tier of keys in tiers of keys 502 is generated from a different number of components in a universal resource locator in the request that causes the server data processing system to return the response that is stored in the data structure.

As depicted, all of keys 302 in tier of keys 504 point to a same response in responses 128. Each key in tier of keys 504 is generated using a different number of components 510 from universal resource locator 506.

Figure 6:
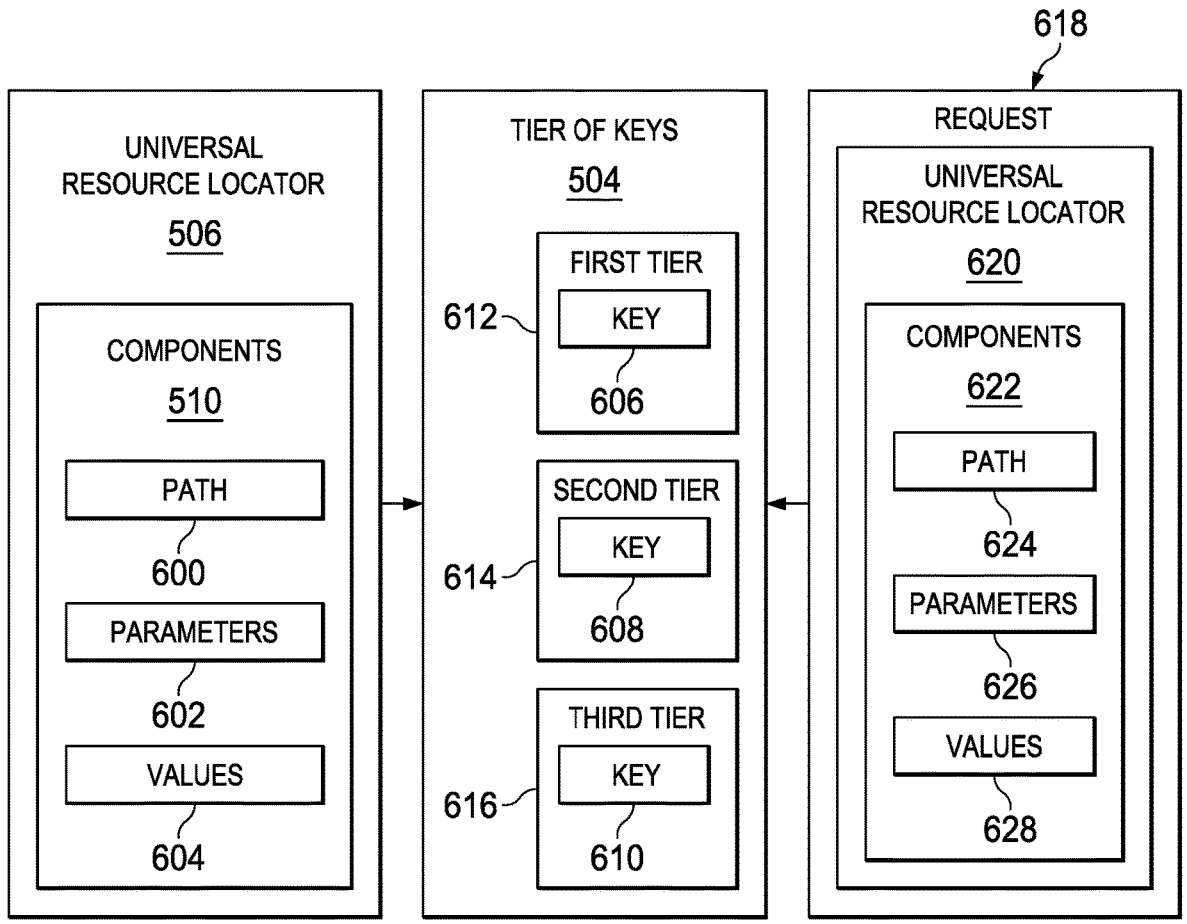
FIG. 6 is an illustration of a block diagram of data flow for generating a tier of keys from a universal resource locator in accordance with an illustrative embodiment.

With reference to FIG. 6, an illustration of a block diagram of data flow for generating a tier of keys from a universal resource locator is depicted in accordance with an illustrative embodiment. In this example, the generation of tier of keys 504 is depicted. As depicted, components 510 in universal resource locator 506 for a request in requests 126 comprise path 600, parameters 602, and values 604.

In this illustrative example, path 600 includes the address of the website hosted by a web server and the path to the content on the web server. Parameters 602 are used to specify the content that is being requested. For example, parameters 602 may include variables for identifying the content. Values 604 are the values for parameters 602.

As depicted, tier of keys 504 includes 3 keys, key 606, key 608, and key 610. Each key in tier of keys 504 is on a different tier in this example. Key 606 is on first tier 612; key 608 is on second tier 614; and key 610 is on third tier 616. First tier 612 is the highest tier and the most specific tier. Third tier 616 is the lowest tier and the least specific tier.

In the illustrative example, key 606 on first tier 612 is based on path 600, parameters 602, and values 604. Key 608 on second tier 614 is based on path 600 and parameters 602, and key 610 on third tier 616 is based on path 600.

Each of the keys in tier of keys 504 point to the same response. As a result, if a universal resource locator in a request is made during a demonstration that does not correspond to the first tier of keys, an examination may be made as to whether a less specific form of the universal resource locator matches lower tiers of keys.

For example, if request 618 is received containing universal resource locator 620, different portions of components 622 in universal resource locator 620 may be used to determine whether a match is found with any of the keys in tier of keys 504. Initially, path 624, parameters 626, and values 628 may be used to determine whether a match is present to key 606 in first tier 612. This type of matching is the most specific match involving all of components 622.

If a match is not present, then path 624 and parameters 626 may be used to determine whether a match is present to key 608 in second tier 614. This matching is less specific than using path 624, parameters 626, and values 628.

Finally, path 624 may be used to determine whether a match is present to key 610 in third tier 616 if a match is not present with the other keys in the other tiers. This type of matching is the least specific type of matching in this particular example.

The illustration of application environment 100 and the different components in this environment in FIGS. 1-6 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, operator 109 is described as preparing the demonstration of application 108 and giving the demonstration to client 134. In another illustrative example, operator 109 generates data structure 144 and another person demonstrates application 108 to client 134.

Further, in the illustrative example, a standalone demonstration is created and presented on client data processing system 104. In another illustrative example, recorder 200 creates data structure 144 on client data processing system 104. Data structure 144, web page 110 with application 108, and server emulator 202 may be placed on a different client data processing system for performing a standalone demonstration to client 134.

As another example, although three tiers of keys are shown in FIG. 6, other numbers of tiers may be used. For example, another tier may be used by dividing the path into the internet protocol address and a port number, and the file path to the content. The internet protocol address and a port number may be one tier and the file path may be a second tier. In still other examples, only two tiers may be used depending on the particular implementation.

As another example, records 304 in FIG. 3 may include other information in addition to requests 126 and responses 128. For example, operator 109 may highlight portions of application 108 that have requests 126 and responses 128. In the illustrative example, not all of the features in application 108 may be included in requests 126 and responses 128. As a result, highlighting may indicate to someone demonstrating application 108 which features should be shown or used. The highlighting may indicate which features may be demonstrated but not necessary in the order in which features should be demonstrated.

In still another example, one or more tables in addition to table 300 may be generated for application 108. A table may be generated for a feature or multiple features for application 108. For example, an application may include features such as time and attendance, benefits, time off, payroll, and other suitable features. A table may be created for each of these features rather than having only table 300.

In yet another illustrative example, browser 112 may part of a mobile application. The mobile application may be a thin wrapper around browser 112.

Using multiple tables may reduce the use of resources such as memory. Additionally, generating table 300 for all features for application 108 may be infeasible. Creating tables for different features may provide for more flexibility in production and storage space.

Turning next to FIGS. 7-10, illustrations of an application in a web page in a browser are depicted in accordance with an illustrative embodiment. These figures illustrate steps that occur in creating a standalone demonstration of the application.

Figure 7:
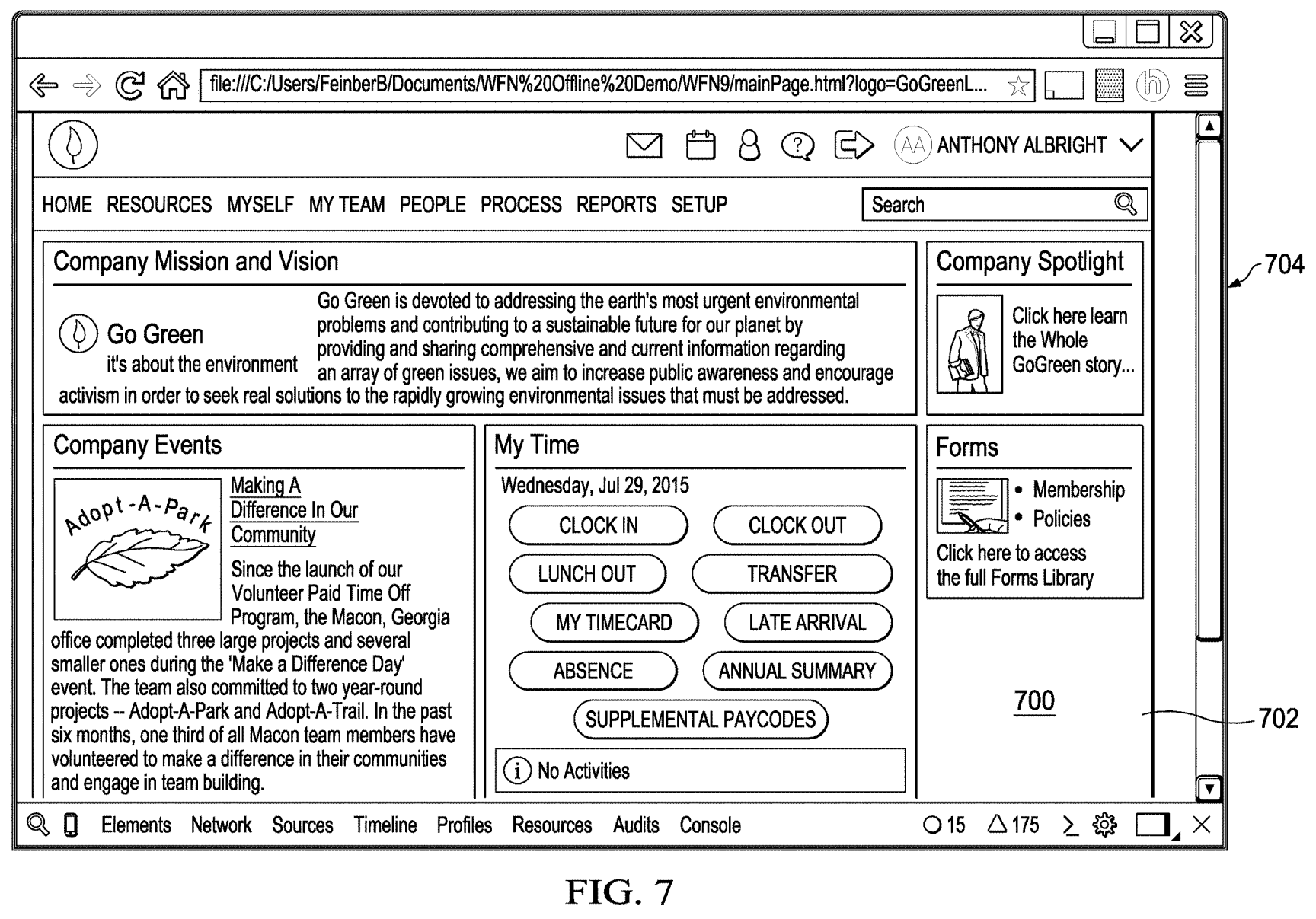

Turning first to FIG. 7, an illustration of an application in a web page in a browser is depicted in accordance with an illustrative embodiment. As depicted, FIG. 7 depicts an initial view of application 700 in web page 702 when first loaded in browser 704. Application 700 in web page 702 in browser 704 is an example of a display of application 108 and web page 110 in browser 112 shown in block form in FIG. 1.

A recorder, such as recorder 200 in application demonstration system 140 shown in block form in FIG. 2, runs as an operator and interacts with application 700 displayed in browser 704. The selection of different features in application 700 results in requests being made and responses being returned.

In this illustrative example, a feature in application 700 is a portion of application 700 that may be selected in a manner that generates a request. The portion may be text, a box, a control, or some other graphical element.

In this illustrative example, the recorder records the requests and responses made by application 700 to form a data structure, such as data structure 144 in FIG. 1 and table 300 in FIGS. 3-5. This data structure is used to emulate the web server when application 700 is demonstrated at a later time.

Figure 8:
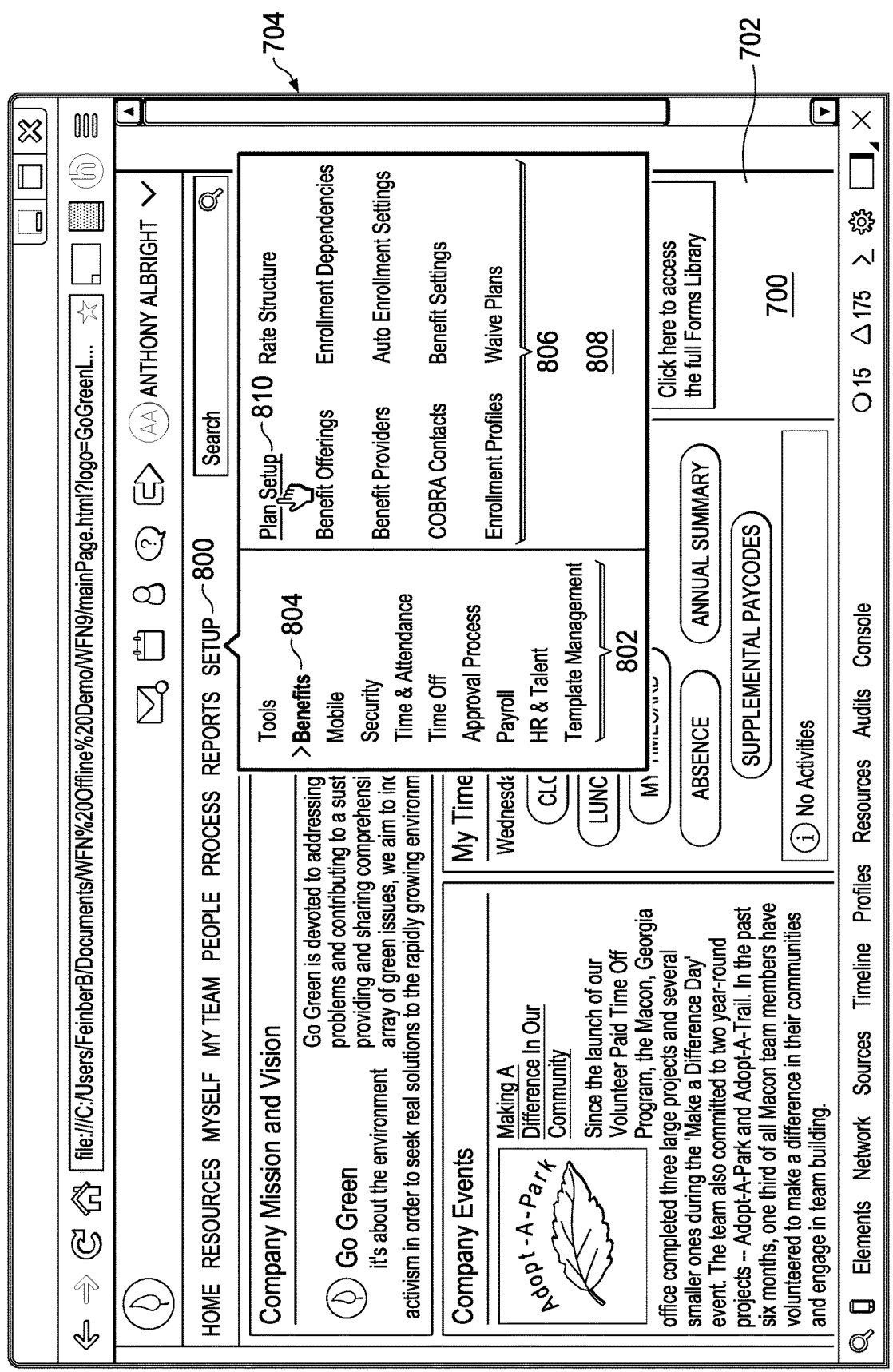
FIG. 8 is an illustration of an application in a web page in a browser in accordance with an illustrative embodiment.

With reference next to FIG. 8, another illustration of an application in a web page in a browser is depicted in accordance with an illustrative embodiment. In this view, the operator has selected a feature, setup 800 in application 700. Selection of setup 800 results in menu 802 being displayed. As depicted, the recorder may detect the request generated from the selection of setup 800 and the response returned containing content used to display menu 802.

Further, the selection of benefits 804 results in features 806 being displayed in section 808 of menu 802. Features 806 are specific to benefits 804. The selection of benefits 804 results in a request being sent by application 700 and a response being received containing content. As depicted, the content is displayed in the form of features 806 in section 808. The recorder also identifies and stores this request and response.

In this illustrative example, plan setup 810 in features 806 is shown as being highlighted for selection. The selection of plan setup 810 results in a request being sent and a response being returned for this feature.

Figure 9:
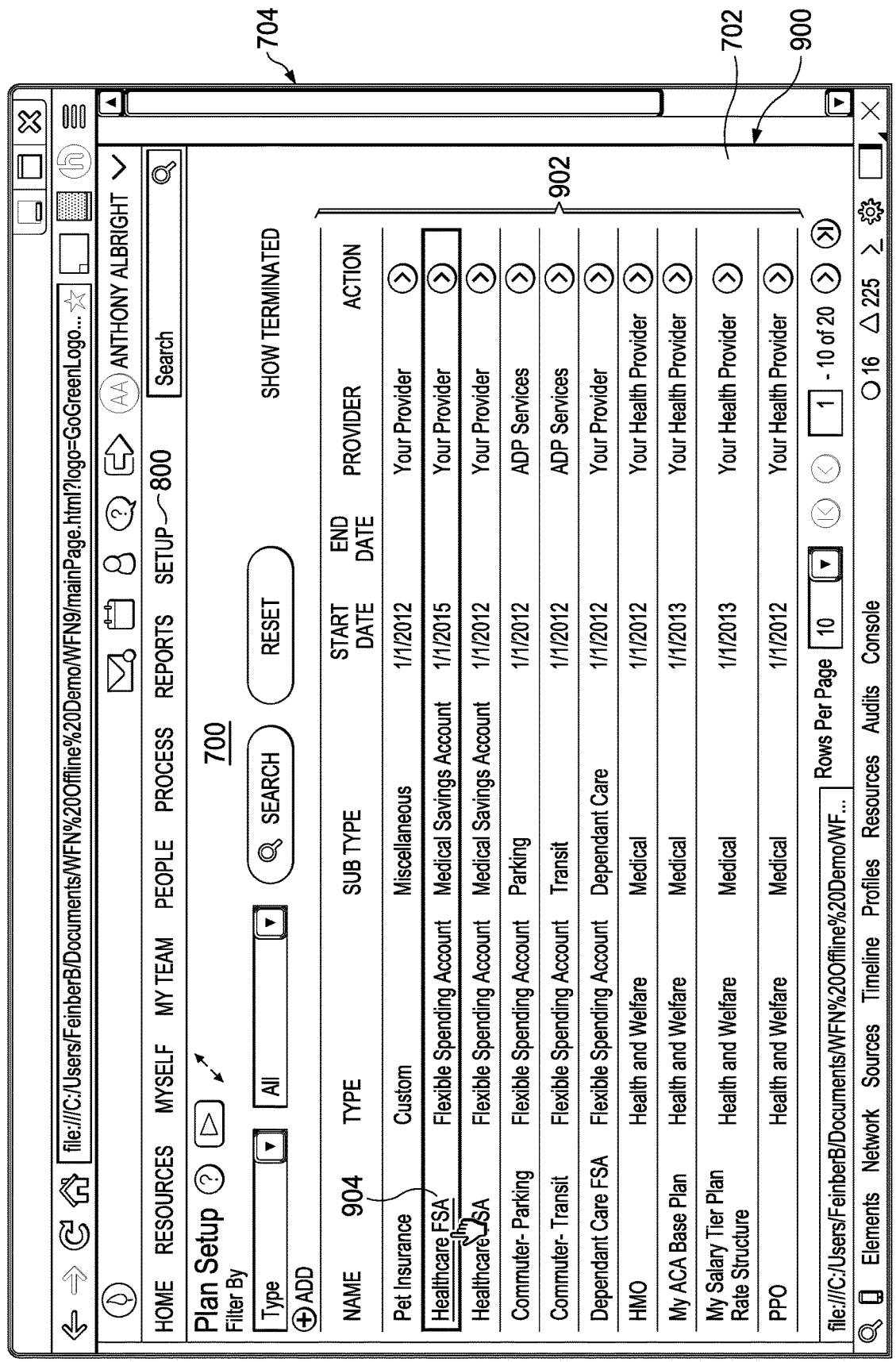
FIG. 9 is an illustration of an application in a web page in a browser in accordance with an illustrative embodiment.

In FIG. 9, an illustration of an application in a web page in a browser is depicted in accordance with an illustrative embodiment. In this figure, window 900 is displayed using content received in a response to the request sent from a selection of plan setup 810 in FIG. 8. The recorder identifies and saves the response used to display window 900.

As depicted in this example, window 900 displays features 902 that may be selected to show additional features that may be demonstrated. In this example, the selection of Healthcare FSA 904 results in a request being sent for information about a particular type of healthcare plan. The recorder identifies and stores the request for the healthcare plan information as well as the response returned.

Additionally, the operator also may select to highlight Healthcare FSA 904. This highlighting of Healthcare FSA 904 also may be detected and stored by the recorder. The highlighting may later be displayed during the demonstration as an indicator to select Healthcare FSA 904.

The highlighting is made for purposes of providing hints to an operator during a standalone demonstration that occurs at a later time. The highlighting is an indicator that indicates a request and response is present in the data structure for the feature, plan setup 810, when application 700 is demonstrated at a later time using the data structure.

Figure 10:
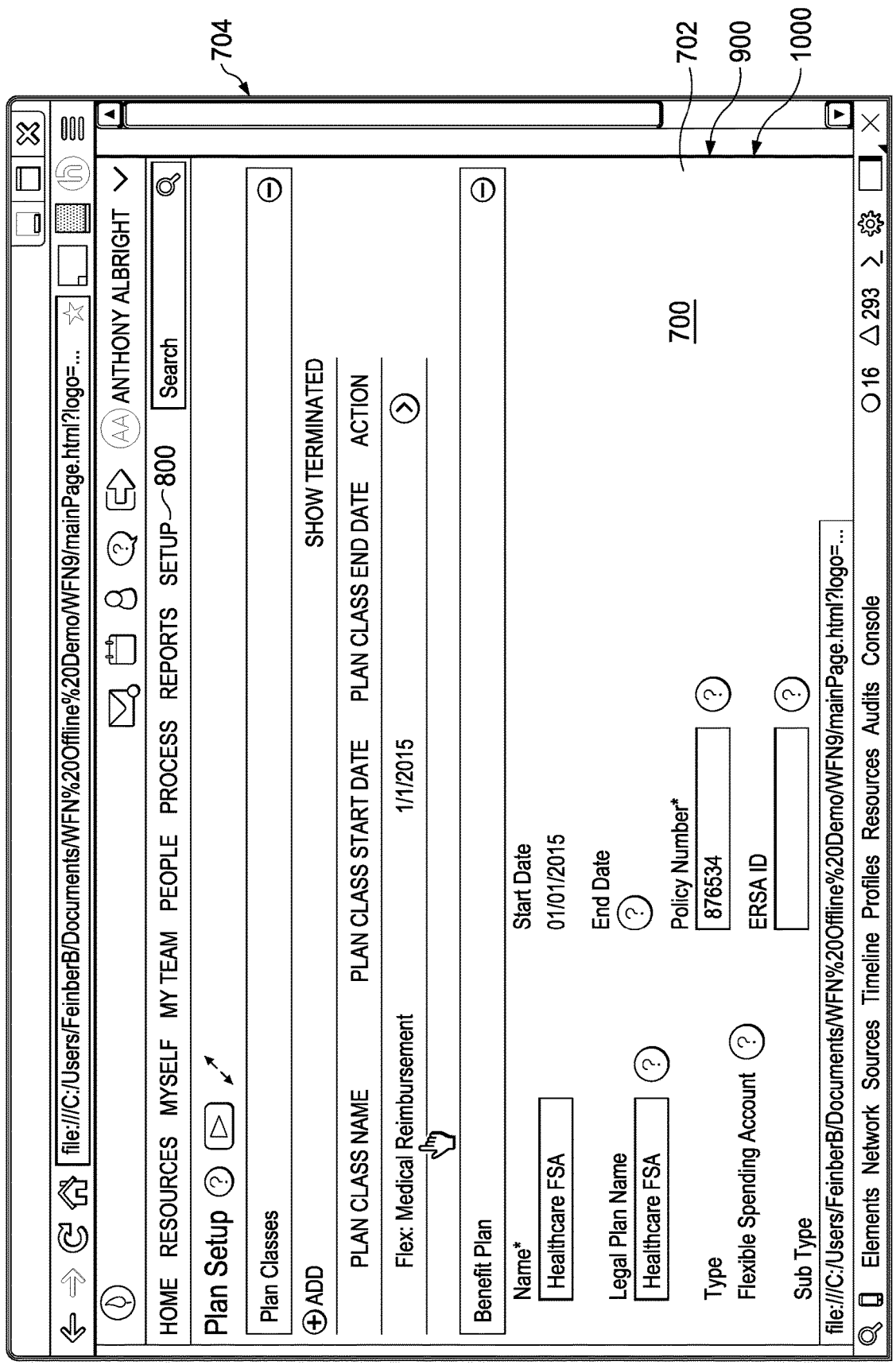
FIG. 10 is an illustration of an application in a web page in a browser in accordance with an illustrative embodiment.

With reference now to FIG. 10, an illustration of an application in a web page in a browser is depicted in accordance with an illustrative embodiment. As depicted, window 1000 illustrates the content in a healthcare plan displayed in response to the selection of Healthcare FSA 904 in FIG. 9. The content in window 1000 is received in a response to the request generated from selecting Healthcare FSA 904 in FIG. 9.

The illustration of application 700 and the different steps performed to generate a data structure for a standalone demonstration in FIGS. 7-10 is shown for purposes of illustrating an example of one manner in which a standalone demonstration may be created. These figures are not meant to limit the display of applications and interactions to the one shown in these figures.

For example, other types of features may be used in addition to or in place of the one shown in this particular example. Also, in some illustrative examples, features may not be highlighted as guidance of available features for demonstration.

Figure 11:
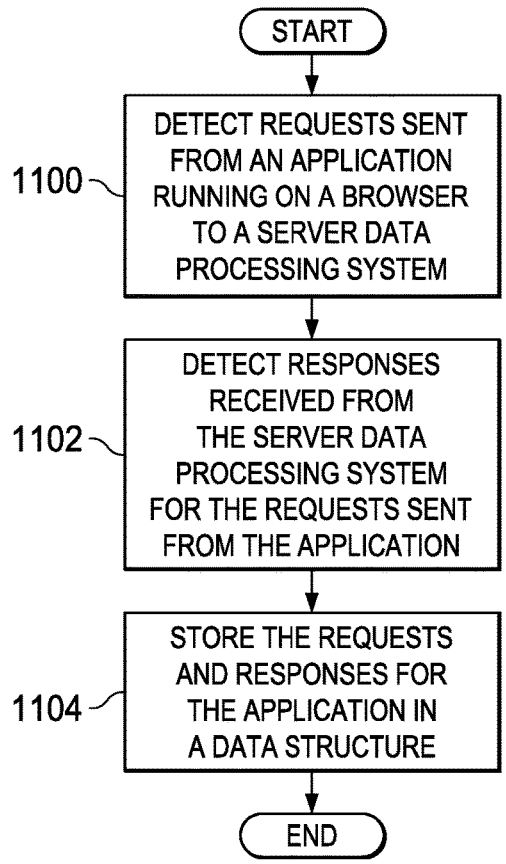
FIG. 11 is an illustration of a flowchart of a process for a standalone demonstration of an application in accordance with an illustrative embodiment.

Turning next to FIG. 11, an illustration of a flowchart of a process for a standalone demonstration of an application is depicted in accordance with an illustrative embodiment. The process illustrated in FIG. 11 may be implemented in application environment 100 in FIG. 1. For example, the steps illustrated in this flowchart may be implemented in application demonstration system 140 in FIG. 1.

The steps in this flowchart enable a standalone demonstration to be made using an application. The steps in this flowchart may be implemented in recorder 200 in application demonstration system 140 in FIG. 2.

The process begins by detecting requests sent from an application running on a browser to a server data processing system (step 1100). The process detects responses received from the server data processing system for the requests sent from the application (step 1102).

The requests and responses for the application are stored in a data structure (step 1104) with the process terminating thereafter. In step 1104, the responses are associated with the requests that resulted in the responses being returned when stored in the data structure. The requests and responses enable simulating the server data processing system to perform the standalone demonstration of the application running on the browser on a client data processing system using the data structure without communicating with the server data processing system.

Figure 12:
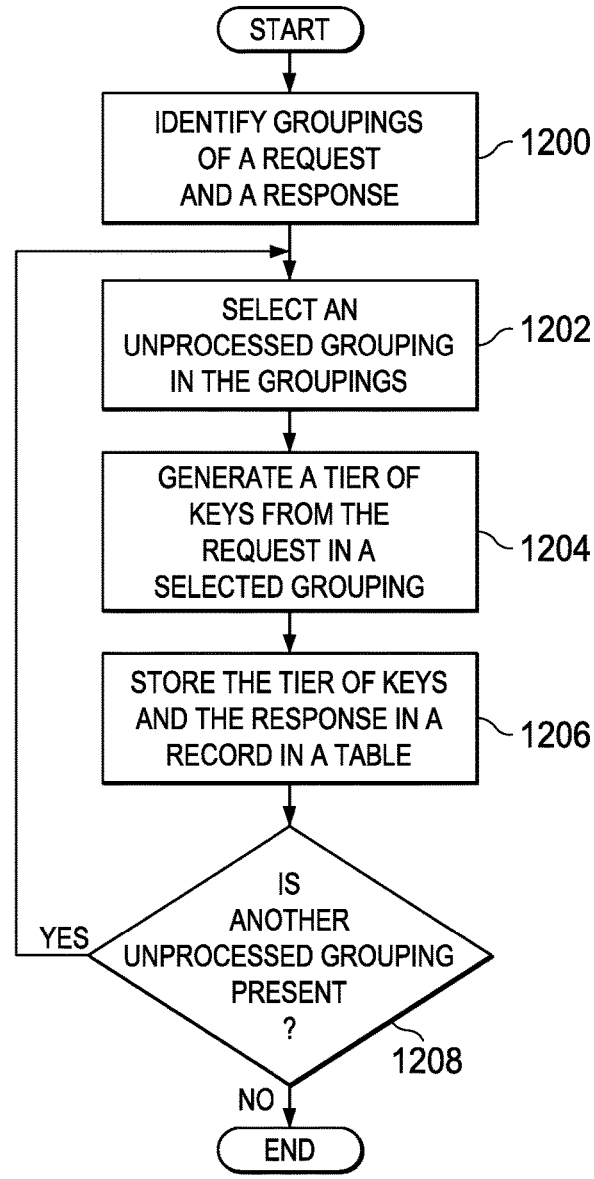
FIG. 12 is an illustration of a flowchart of a process for generating a data structure in accordance with an illustrative embodiment.

With reference to FIG. 12, an illustration of a flowchart of a process for generating a data structure is depicted in accordance with an illustrative embodiment. The process in this flowchart may be used to create data structure 144 in FIG. 1. In this example, the data structure may be table 300 in FIGS. 3-5. The process in this flowchart is an example of an implementation of step 1104 in FIG. 11.

The process begins by identifying groupings of a request and a response (step 1200). In this example, each request has a single response. As depicted, a grouping is a request and the response returned for the request.

The process selects an unprocessed grouping in the groupings (step 1202). The process generates a tier of keys from the request in the selected grouping (step 1204). The keys in the tier of keys may be generate in a number of different ways and may be performed using currently available key generation techniques used for tables and for databases. For example, the request may be used to generate a hash to form a key or may use the request directly.

The process stores the tier of keys and the response in a record in the table (step 1206). A determination is made as to whether another unprocessed grouping is present. If another grouping is present, the process returns to step 1202. Otherwise, the process terminates.

With reference now to FIG. 13, an illustration of a flowchart of a process for generating a tier of keys is depicted in accordance with an illustrative example. The process illustrated in FIG. 13 is an example of an implementation for step 1204 in FIG. 12.

The process begins by identifying components in a universal resource locator in a request (step 1300). The process generates a first key using a path, parameters, and values in the universal resource locator (step 1302). In the illustrative example, the parameter and values may also be obtained from POST data in addition to the universal resource locator. The process then generates a second key using the path and the parameters in the universal resource locator (step 1304). The process generates a third key using the path in the universal resource locator (step 1306) with the process terminating thereafter.

This process generates keys that all point to the same response. This process may be repeated for each response and request identified for the application.

Turning next to FIG. 14, an illustration of a flowchart of a process for creating indicators for features in an application is depicted in accordance with an illustrative embodiment. The process illustrated in FIG. 14 may be implemented in recorder 200 in application demonstration system 140 in FIGS. 1-2. The process may be used to generate an indicator that is displayed graphically in association with a feature for which attention is desired during a standalone demonstration of the application.

The process begins by detecting a command to generate indicators (step 1400). The process detects a user input selecting a feature in the application for emphasis (step 1402).

The process stores an indicator for the feature in a data structure (step 1404) with the process terminating thereafter. The indicator is displayed in association with a display of the feature when the standalone demonstration of the application is displayed. This display is a graphical one that draws attention to the feature. The indicator may be selected from at least one of highlighting, a font, bolding, italics, underlining, animation, a border, a graphic, or some other type of indicator that draws the attention of the viewer to the feature.

Turning next to FIG. 15, an illustration of a flowchart of a process for demonstrating an application is depicted in accordance with an illustrative embodiment. The process in this flowchart uses the data structure of requests and responses generated in FIG. 1 to demonstrate the application. This process may be implemented in server emulator 202 in application demonstration system 140 in FIGS. 1-2.

The process begins by running an application on a client data processing system (step 1500). The process receives a request from the client data processing system at a server emulator (step 1502).

The process identifies a response in a data structure stored on the client data processing system using the request as a key to identify the response (step 1504). The process returns the response to the application (step 1506) with the process terminating thereafter.

Figure 16:
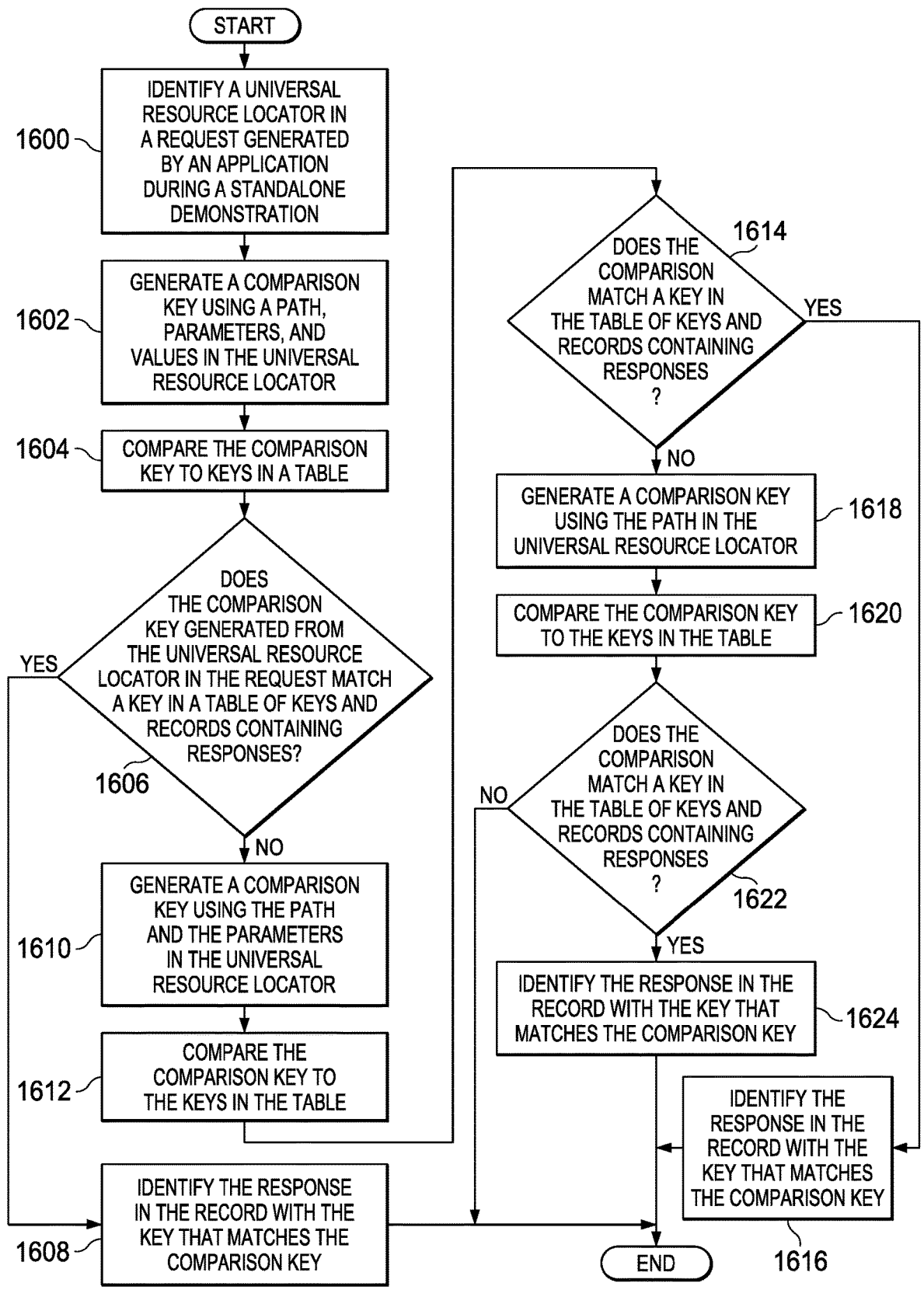
FIG. 16 is an illustration of a flowchart of a process for identifying a response in a data structure during a standalone demonstration of an application in accordance with an illustrative embodiment.

With reference now to FIG. 16, an illustration of a flowchart of a process for identifying a response in a data structure during a standalone demonstration of an application is depicted in accordance with an illustrative embodiment.

The process begins by identifying a universal resource locator in a request generated by an application during a standalone demonstration (step 1600). The process generates a comparison key using a path, parameters, and values in the universal resource locator (step 1602). The comparison key is compared to the keys in the table (step 1604).

A determination is made as to whether the comparison key generated from the universal resource locator in the request matches a key in a table of keys and records containing responses (step 1606). If a match is present, the process identifies the response in the record with the key that matches the comparison key (step 1608) with the process terminating thereafter.

With reference again to step 1606, if a match is not present, the process generates a comparison key using the path and the parameters in the universal resource locator (step 1610). This comparison key is less specific than the key generated in step 1602. For example, the request may select information in a response that is not an exact match to the information in the responses but considered close enough to be used for demonstration purposes.

The comparison key is compared to the keys in the table (step 1612). A determination is made as to whether the comparison key matches a key in a table of keys and records containing responses (step 1614). If a match is present, the process identifies the response in the record with the key that matches the comparison key (step 1616) with the process terminating thereafter.

With reference again to step 1614, if a match is not present, the process generates a comparison key using the path in the universal resource locator (step 1618). This comparison key is less specific than the key generated in step 1602 and step 1610.

The comparison key is compared to the keys in the table (step 1620). A determination is made as to whether the comparison key matches a key in a table of keys and records containing responses (step 1622). If a match is present, the process identifies the response in the record with the key that matches the comparison key (step 1624) with the process terminating thereafter.

With reference again to step 1622, if a match is not present, the process terminates. In this case, a response is not identified for the request.

This process may be repeated any number of times during the demonstration of the application. In this manner, the request is compared to keys in tiers of keys that are based on the universal resource locators from requests made when creating the data structure. Thus, the process may identify a best match between the request and the keys in the tiers of keys.

Thus, a particular feature selected may not have a response in the data structure. However, another request with a response may be close enough to return for use in the demonstration even though an exact match may not be present.

For example, the parameters may be for health benefits for a particular plan. The values may be for a particular person or age group. The selection of the feature may have the same parameters for the health benefits for the plan but not the same person or age group. For demonstration purposes, displaying the response is sufficient for demonstrating the feature and no reliance on the information is made.

In this manner, the application may be demonstrated without needing access to a server data processing system. In other words, the application may be demonstrated to a client without an internet or network connection. With the requests and responses stored locally, the application may operate with the selection of components for functions, tasks, or activities in any order. As a result, the demonstration may be more interactive because a scripted set of steps does not have to be followed for the application to operate when communication with a server data processing system that is normally used is absent.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in FIG. 16, if indicators are stored separately from the response, the process may also identify an indicator for the response in addition to identifying the response. The tier of keys may also point to the indicator that is stored in the data structure. As another illustrative example, the response may include a pointer to the indicator.

Figure 17:
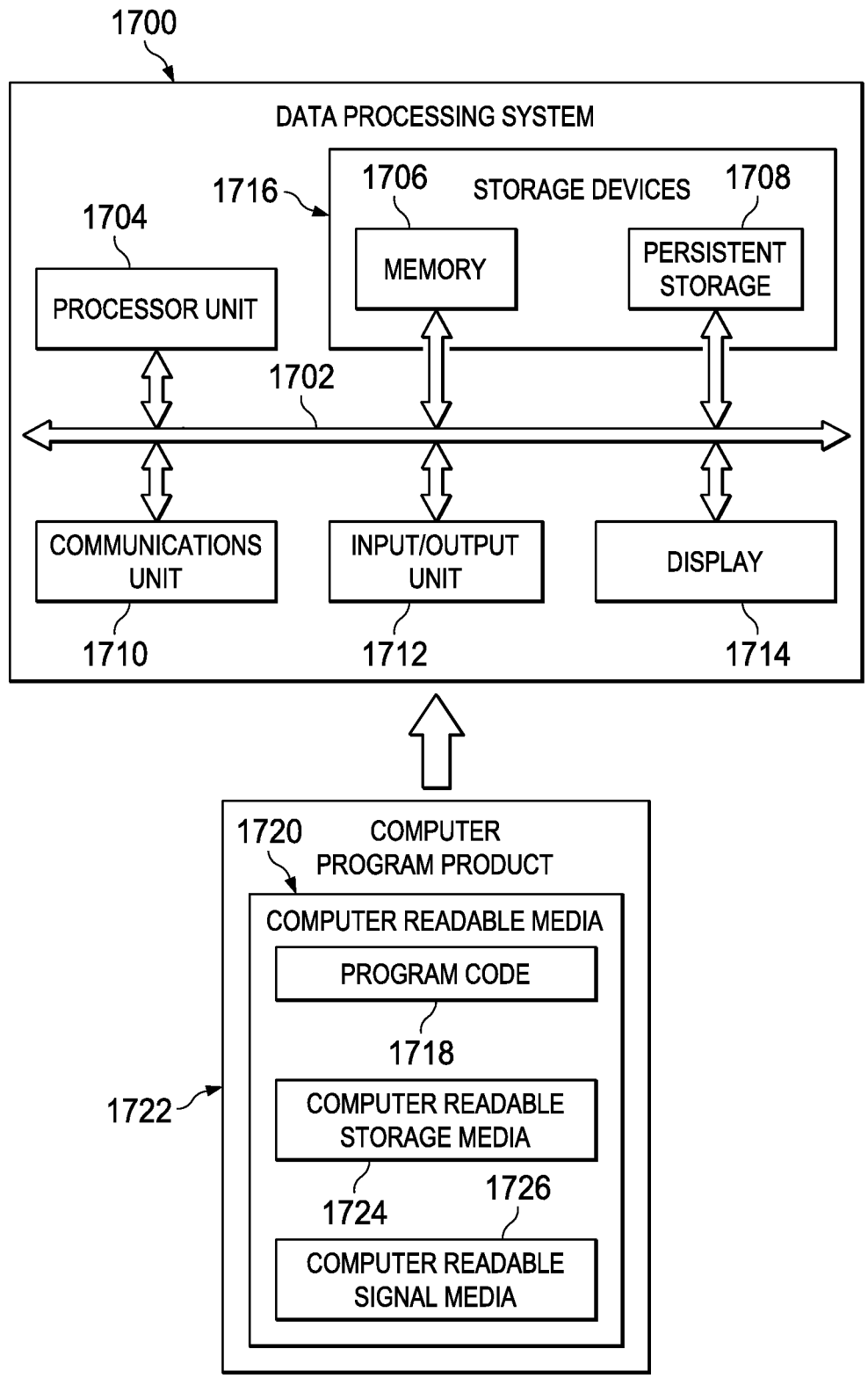
FIG. 17 is an illustration of a block diagram of a data processing system in accordance with an illustrative embodiment.

Turning now to FIG. 17, an illustration of a block diagram of a data processing system is depicted in accordance with an illustrative embodiment. Data processing system 1700 may be used to implement computer system 102 in FIG. 1. For example, data processing system 1700 may be used to implement client data processing system 104 and server data processing system 106 in FIG. 1. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 may take the form of a bus system.

Processor unit 1704 serves to execute instructions for software that may be loaded into memory 1706. Processor unit 1704 may be a number of processors, a multi-processor core, or some other type of processor, depending on the particular implementation.

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer readable storage devices in these illustrative examples. Memory 1706, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different embodiments may be performed by processor unit 1704 using computer-implemented instructions, which may be located in a memory, such as memory 1706.

These instructions are referred to as program code, computer usable program code, or computer readable program code that may be read and executed by a processor in processor unit 1704. The program code in the different embodiments may be embodied on different physical or computer readable storage media, such as memory 1706 or persistent storage 1708.

Program code 1718 is located in a functional form on computer readable media 1720 that is selectively removable and may be loaded onto or transferred to data processing system 1700 for execution by processor unit 1704. Program code 1718 and computer readable media 1720 form computer program product 1722 in these illustrative examples. In one example, computer readable media 1720 may be computer readable storage media 1724 or computer readable signal media 1726.

In these illustrative examples, computer readable storage media 1724 is a physical or tangible storage device used to store program code 1718 rather than a medium that propagates or transmits program code 1718. Alternatively, program code 1718 may be transferred to data processing system 1700 using computer readable signal media 1726. Computer readable signal media 1726 may be, for example, a propagated data signal containing program code 1718. For example, computer readable signal media 1726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code 1718.

Thus, one or more technical solutions are present that overcome a technical problem with demonstrating an application that provides a predictable experience to the client. Application demonstration system 140 in FIGS. 1-2 ensures that the data displayed by an application during a demonstration is what is expected. In this manner, the demonstration of the application to the client may occur using data that the client is able to relate to during the demonstration.

Also, a lack of an internet connection or a poor internet connection does not hamper or make performing the demonstration impossible. In this manner, one or more technical solutions may provide a technical effect in which a stand-alone demonstration occurs that is predictable for providing a desired experience to the client. Also, delays in displaying data or slow responsiveness of the application may be reduced or avoided.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for a standalone demonstration of an application, the method comprising:
   detecting, by a computer system, requests sent from the application running on a browser to a server data processing system;
   generating tiers of keys from universal resource locators in the requests, wherein a tier of keys in the tiers of keys is based off of a universal resource locator in the universal resource locators in which all of the keys in the tier of keys point to a same response in the responses, and wherein each key in the tier of keys is generated using a different number of components from the universal resource locator;
   detecting, by the computer system, responses received from the server data processing system for the requests sent from the application; and
   storing, by the computer system, the requests and the responses for the application in a data structure, wherein keys are used to identify the responses in the data structure, wherein the requests and the responses enable simulating the server data processing system to perform the standalone demonstration of the application running on the browser on a client data processing system using the data structure without communicating with the server data processing system.

2. The method of claim 1, wherein the data structure is a table with the requests used as keys to the responses in the table.

3. The method of claim 1, wherein components in the universal resource locator comprise a path, parameters, and values.

4. The method of claim 1 further comprising:
running the application on the client data processing system;
receiving, by a server emulator, a request from the application at the server emulator on the client data processing system;
identifying, by the server emulator, a response in the data structure stored on the client data processing system using the request as a key to identify the response; and
returning, by the server emulator, the response to the application.

5. The method of claim 1, wherein the application is located in a web page.

6. The method of claim 1 further comprising:
detecting a user input selecting a function in the application for emphasis; and
storing an indicator in the data structure, wherein the indicator is displayed in association with a display of the function when the standalone demonstration of the application is performed.

7. A method for a standalone demonstration of an application, the method comprising:
running the application on a browser on a client data processing system;
receiving, by a server emulator, a request from the client data processing system at the server emulator in which the request is directed to a server data processing system;
identifying, by the server emulator, a response in a data structure stored on the client data processing system using the request as a key to identify the response, wherein the data structure stores requests previously sent to the server data processing system, tiers of keys generated from universal resource locators in the requests, and responses for the application received from the server data processing system, wherein a tier of keys in the tiers of keys is based off of a universal resource locator in the universal resource locators in which all of the keys in the tier of keys point to a same response in the responses, and wherein each key in the tier of keys is generated using a different number of components from the universal resource locator; and
returning, by the server emulator, the response to the application, wherein the requests and the responses stored in the data structure enable simulating the server data processing system to perform the standalone demonstration of the application running on the browser on the client data processing system using the data structure without communicating with the server data processing system.

8. The method of claim 7, wherein the identifying step comprises:
comparing the request to keys in tiers of keys that are based on universal resource locators from the requests made when creating the data structure to identify a best match between the request and the keys in the tiers of keys.

9. A computer system comprising:
an application running on a browser; and
a recorder that detects responses received from a server data processing system for requests sent from the application generates tiers of keys from universal resource locators in the requests, and stores the requests, the tiers of keys, and responses for the application in a data structure, wherein the requests and the responses enable simulating the server data processing system to perform a standalone demonstration of the application running on the browser on a client data processing system using the data structure without communicating with the server data processing system, wherein keys are used to identify the responses in the data structure, wherein a tier of keys in the tiers of keys is based off of a universal resource locator in the universal resource locators in which all of the keys in the tier of keys point to a same response in the responses, and wherein each key in the tier of keys is generated using a different number of components from the universal resource locator.

10. The computer system of claim 9, wherein the data structure is a table with the requests used as keys to the responses in the table.

11. The computer system of claim 9, wherein components in the universal resource locator comprise a path, parameters, and values.

12. The computer system of claim 9 further comprising:
a server emulator that the client data processing system on which the application runs for the standalone demonstration; receives a request from the application at the server emulator on the client data processing system; identifies a response in the data structure stored on the client data processing system using the request as a key to identify the response; and returns the response to the application.

13. The computer system of claim 9, wherein the application is located in a web page.

14. The computer system of claim 9, wherein the recorder detects a user input selecting a function in the application for emphasis and stores an indicator in the data structure, wherein the indicator is displayed in association with a display of the function when the standalone demonstration of the application is performed.

15. The computer system of claim 9, wherein the client data processing system is selected from one of a tablet computer, a mobile phone, a laptop computer, a desktop computer and a work station.

16. A computer system comprising:
a client data processing system;
an application running on a browser on the client data processing system; and
a server emulator that receives a request from the client data processing system at the server emulator in which the request is directed to a server data processing system; identifies a response in a data structure stored on the client data processing system using the request as a key to identify the response, wherein the data structure stores requests previously sent to the server data processing system, tiers of keys generated from universal resource locators in the requests, and responses for the application received from the server data processing system; and returns the response to the application, wherein a tier of keys in the tiers of keys is based off of a universal resource locator in the universal resource locators in which all of the keys in the tier of keys point to a same response in the responses, and wherein each key in the tier of keys is generated using a different number of components from the universal resource locator, wherein the requests and the responses stored in the data structure enable simulating the server data processing system when performing a standalone demonstration of the application running on a browser on the client data processing system using the data structure without communicating with the server data processing system to obtain the responses.

17. A computer program product for a standalone demonstration of an application, the computer program product comprising:
   a computer readable storage media;
   first program code, stored on the computer readable storage media, for detecting requests sent from an application running on a browser to a server data processing system;
   second program code, stored on the computer readable storage media, for detecting responses received from the server data processing system for the requests sent from the application; and
   third program code, stored on the computer readable storage media, for storing the requests, tiers of keys generated from universal resource locators in the requests, and the responses for the application in a data structure, wherein keys are used to identify the responses in the data structure, wherein a tier of keys in the tiers of keys is based off of a universal resource locator in the universal resource locators in which all of the keys in the tier of keys point to a same response in the responses, and wherein each key in the tier of keys is generated using a different number of components from the universal resource locator, wherein the requests and the responses enable simulating the server data processing system to perform the standalone demonstration of the application running on the browser on a client data processing system using the data structure without communicating with the server data processing system.

18. The computer program product of claim 17 further comprising:
   fourth program code, stored on the computer readable storage media, for generating keys from the requests, wherein the keys are used to identify the responses in the data structure.

19. The computer program product of claim 18, wherein components in the universal resource locator comprise a path, parameters, and values.

20. The computer program product of claim 17 further comprising:
   fourth program code, stored on the computer readable storage media, for receiving, by a server emulator, a request from the application at the server emulator, wherein the application and the server emulator run on the client data processing system;
   fifth program code, stored on the computer readable storage media, for identifying, by the server emulator, a response in the data structure stored on the client data processing system using the request as a key to identify the response; and
   sixth program code, stored on the computer readable storage media, for returning, by the server emulator, the response to the application.

* * * * *